(12) United States Patent
Menge et al.

(10) Patent No.: US 8,481,952 B2
(45) Date of Patent: Jul. 9, 2013

(54) SCINTILLATION SEPARATOR

(75) Inventors: Peter R. Menge, Chagrin Falls, OH (US); Louis Perna, Elyria, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 344 days.

(21) Appl. No.: 12/644,551

(22) Filed: Dec. 22, 2009

(65) Prior Publication Data

US 2010/0155610 A1   Jun. 24, 2010

Related U.S. Application Data

(60) Provisional application No. 61/140,321, filed on Dec. 23, 2008.

(51) Int. Cl.
*G01T 1/20*   (2006.01)

(52) U.S. Cl.
USPC .......................................................... 250/368

(58) Field of Classification Search
USPC .......................................................... 250/368
See application file for complete search history.

(56) References Cited

U.S. PATENT DOCUMENTS

| | | | |
|---|---|---|---|
| 4,720,426 A | 1/1988 | Englert et al. | |
| 5,378,894 A * | 1/1995 | Akai | 250/368 |
| 5,410,791 A | 5/1995 | Wirth et al. | |
| 5,869,836 A | 2/1999 | Linden et al. | |
| 6,222,192 B1 | 4/2001 | Sekela et al. | |
| 6,359,282 B1 | 3/2002 | Sekela | |
| 6,362,479 B1 | 3/2002 | Andreaco et al. | |
| 6,749,761 B1 * | 6/2004 | Andreaco et al. | 216/24 |
| 6,881,960 B2 | 4/2005 | Schreiner et al. | |
| 6,909,097 B2 | 6/2005 | Schreiner et al. | |
| 7,054,408 B2 | 5/2006 | Jiang et al. | |
| 7,102,136 B2 | 9/2006 | Fontbonne | |
| 7,138,633 B1 | 11/2006 | Rozsa et al. | |
| 7,297,393 B2 | 11/2007 | Jonza et al. | |
| 7,703,121 B2 | 4/2010 | Vau et al. | |
| 7,927,393 B2 | 4/2011 | Sanami | |
| 2002/0190214 A1 | 12/2002 | Wieczorek et al. | |
| 2004/0232342 A1 | 11/2004 | Aykac et al. | |
| 2007/0007460 A1 | 1/2007 | Hochstetler et al. | |
| 2008/0290285 A1 | 11/2008 | Wakamatsu | |
| 2009/0065700 A1 | 3/2009 | Menge et al. | |

(Continued)

FOREIGN PATENT DOCUMENTS

| | | |
|---|---|---|
| JP | 2002-311142 A | 10/2002 |
| WO | 2006064393 A2 | 6/2006 |

(Continued)

OTHER PUBLICATIONS

International Search Report received in International Patent Application No. PCT/US2009/069193, International Filing Date: Dec. 22, 2009, 3 pages.

(Continued)

*Primary Examiner* — Constantine Hannaher

(74) *Attorney, Agent, or Firm* — Abel Law Group, LLP; Robert N. Young

(57) ABSTRACT

A scintillation reflector can include a specular material having a first and second surface, and a first diffuse material arranged adjacent to the first surface of the specular material and proximal to the scintillator surface. The composite reflector may surround at least a portion of a scintillator surface as provide in a scintillation detector.

19 Claims, 10 Drawing Sheets

U.S. PATENT DOCUMENTS

| | | |
|---|---|---|
| 2009/0236534 A1 | 9/2009 | Selfe et al. |
| 2009/0261262 A1 | 10/2009 | Hunt |
| 2009/0294683 A1 | 12/2009 | Perna |
| 2010/0127178 A1 | 5/2010 | Laurence et al. |
| 2010/0148074 A1 | 6/2010 | Menge et al. |

FOREIGN PATENT DOCUMENTS

| | | |
|---|---|---|
| WO | 2008010339 A1 | 1/2008 |
| WO | 2010075384 A2 | 7/2010 |
| WO | 2010078034 A2 | 7/2010 |

OTHER PUBLICATIONS

IEE Transactions on Nuclear Science, "Design and Simulation of Continuous Scintillator with Pixellated Photodetector", vol. 48, No. 4, Aug. 2001., 7 pages.

International Search Report for PCT/US2009/068476 dated Jul. 30, 2010, 3 pgs.

Peter, R. Menge et al., U.S. Appl. No. 12/640,536, filed Dec. 17, 2009, 27 pages.

"Melinex—Pet Film—Teijin DuPont Films," <http://www.teijindupontfilms.jp/english/product/pet_me.html>, printed Oct. 12, 2012, 2 pages.

"Melinex 339 Polyester Film," Melinex 339, The Pilcher Hamilton Corporation, <http://www.pilcherhamilton.com/products/mowpf/mowpf_011_Dupont_Mel_339.html>, printed Aug. 21, 2008, 1 page.

"3M: Material Safety Data Sheet," Vikuiti(TM) Enhanced Specular reflector Film with Adhesive (ESR-A), <www.3M.com>, dated Oct. 10, 2008, 6 pages.

"Vikuiti Enhanced Specular Reflector (ESR)," Vikuiti Display Enhancement, Application Guidelines, 3M Innovation, Electronic Display Lighting Optical Systems Division, <http://www.3M.com/Vikuiti>, 2003, 4 pages.

"Vikuiti Enhanced Specular Reflector (ESR): A reflector for a brighter, more efficient display," Vikuiti Display Enhancement, Reflector, 3M Innovation, Electronic Display Lighting Optical Systems Division, <http://www.3M.com/Vikuiti>, 2002, 2 pages.

"Scintillation Products: Scintillation Crystal Arrays and Assemblies," Saint-Gobain Crystals, BICRON, crismatec, <http://www.detectors.saint-gobain.com/uploadedFiles/SGdetectors/Documents/Brochures/Arrays-Brochure.pdf>, 2004, 8 pages.

"ChemBlink: Online Database of Chemicals from Around the World," <http://www.chemblink.com/products/24938-04-3.htm>, 2008, printed Aug. 21, 2008, 1 page.

"DuPont Teijin Films: Datasheet," <http://www.dupontteijinfilms.com/FilmEnterprise/Datasheet.asp? Result=Print&ID=739&Version=US>, printed Oct. 12, 2012, 2 pages.

"DuPont Teijin Films: Material Safety Data Sheet," printed Aug. 2, 2007, 9 pages.

Takacs, G.J. et al., "Design and simulation of continuous scintillator with pixellated photodetector," University of Wollongong Research Online, Faculty of Engineering, IEEE Transactions on Nuclear Science, vol. 48, No. 4, dated Aug. 2001, 7 pages.

\* cited by examiner

SCINTILLATION SEPARATOR

CROSS REFERENCE TO RELATED APPLICATIONS

The present application claims the benefit of the filing date of U.S. Provisional Application No. 61/140,321 filed on Dec. 23, 2008, the teachings of which are incorporated herein by reference.

FIELD OF THE INVENTION

The present disclosure relates generally to a scintillator reflector that may be used in a detector and, in particular, to a composite scintillator reflector that may include both specular and diffuse material components.

BACKGROUND

Scintillation detectors are generally used to detect relatively high energy photons, electrons or alpha particles wherein high energy may be 1 KeV or higher, including α-particles or β-particles. It may be appreciated that these photons, electrons or alpha particles may not be easily detected by conventional photodetectors, which may, for example, be sensitive to photons at wavelengths of 200 nm or greater, including 200 nm to 800 nm. A scintillator, or scintillation crystal, ceramic or plastic, absorbs ionizing waves or particles and converts the energy of the waves or particles to a light pulse. The light may be converted to electrons (i.e., an electron current) with a photodetector such as a photodiode, charge coupled detector (CCD) or photomultiplier tube. Scintillation detectors may be used in various industries and applications including medical (e.g., to produce images of internal organs), geophysical (e.g., to measure radioactivity of the earth), inspection (e.g., non-destructive, non-invasive testing), research (e.g., to measure the energy of photons and particles), and health physics (e.g., to monitor waves or particles in the environment as it affects humans).

Scintillation detectors may typically include either a single scintillator or a number of scintillators arranged in a planar array. Many scanning instruments include scintillation detectors that comprise pixilated arrays of scintillators. Arrays may consist of a single row of adjoining scintillator pixels (linear array) or multiple rows and columns of adjoining scintillator pixels (2-D array). Linear and 2-D arrays may include thousands of scintillator pixels and the system may be constructed and arranged so that an emission from each pixel can be individually detected by a photodetector.

Reflectors may be utilized to surround and/or separate individual scintillators to reflect light generated by a scintillator back into the scintillator, increasing the detectable signal. Reflectors may also be utilized to prevent cross-talk between scintillators in an array, i.e., prevent light generated by a scintillator from entering another scintillator in the array. The reflectivity and/or opacity of many materials that may be utilized in a reflector may be affected by the thickness of the reflector material. Generally speaking, the greater the thickness of the reflector material, the greater the opacity and/or reflectance may be. However, relatively thick separators may interfere with measurements, being that a portion of the array may be lost to the cross-sectional area occupied by separators. In addition, the use of specular reflectors, which may be more opaque than diffuse reflectors for a given thickness, may cause total internal reflection, which may substantially trap light generated by the scintillator within the scintillator. Thus, three relatively important reflector characteristics may include relatively limited thickness, relatively high diffuse reflectivity, and relatively high opacity. In many reflectors presently available, only two of the three characteristics may be achieved in combination at desired levels for a given application.

SUMMARY OF THE INVENTION

An aspect of the present disclosure relates to a scintillation reflector. The reflector may include a composite reflector including a specular material having a first and second surface, a diffuse material arranged adjacent to the first surface of the specular material, and an adhesive joining the diffuse material and the specular material, wherein the reflector exhibits a total reflectance of greater than 70% of incident light having a wavelength in the range of 350 nm to 750 nm when characterized at a thickness of 0.11 mm.

Yet another aspect of the present disclosure relates to a scintillation detector. The scintillation detector may include a scintillator having a surface and a composite reflector surrounding at least a portion of the scintillator surface. The composite reflector may include a specular material having a first and second surface, and a first diffuse material arranged adjacent to the first surface of the specular material and proximal to the scintillator surface.

Another aspect of the present disclosure relates to a method of forming a scintillation detector. The method may include arranging a first surface of a first diffuse material proximal to at least a portion of a scintillator surface, wherein said first diffuse material further includes a second surface and arranging a specular material adjacent to the second surface of the first diffuse material.

A further aspect of the present disclosure relates to a scintillation detection system. The system may include a scintillator having a surface, a composite reflector surrounding at least a portion of the scintillator surface, a photodetector in optical communication with the scintillator, and an analyzer in electrical communication with the photodetector. The composite reflector may include a specular material having a first and second surface and a first diffuse material arranged adjacent to the first surface of the specular material and proximate to the scintillator surface.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

Figure 1:
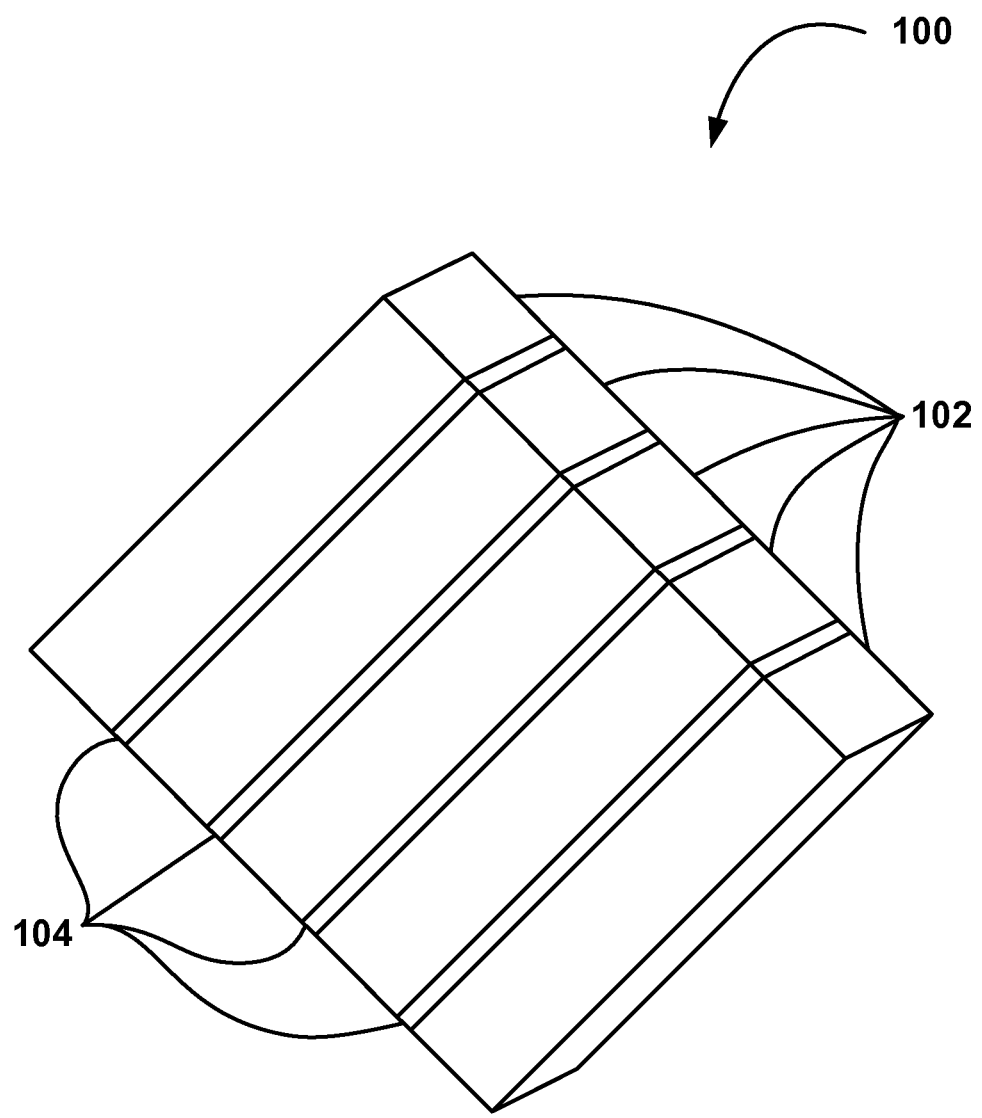
FIG. 1 illustrates an example of a one-dimensional or linear scintillation array.

It is to be understood that disclosure herein may not be limited in its application to the details of construction and the arrangement of components set forth in the following description or illustrated in the drawings. The embodiments herein may also be capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 2:
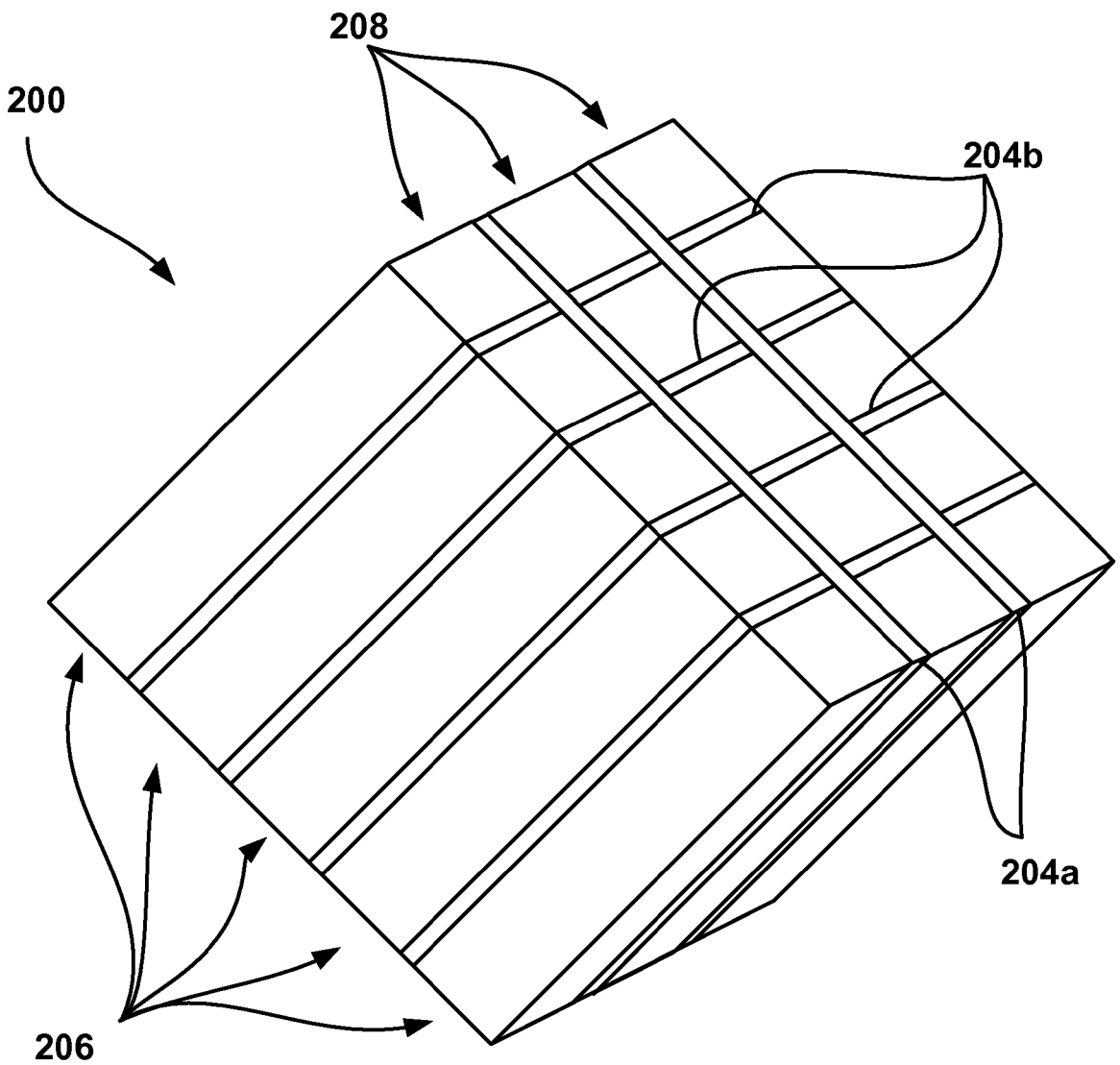
FIG. 2 illustrates an example of a two-dimensional scintillation array.

The present disclosure relates to a scintillation channel reflector. The channel reflector may include both specularly reflective and diffusely reflective components. FIG. 1 illustrates an example of a 1-D or linear scintillation array 100. The array 100 may include two or more scintillators or channels 102. A separator or reflector (herein referred to as reflector) 104 may be positioned between the scintillation channels 102, which may reflect emitted light back into the scintillator and/or prevent light from passing between scintillators. FIG. 2 illustrates an exemplary 2-D array 200, including a number of columns 206 and rows 208 of scintillators or channels. It may be appreciated that while a 5 channel array is illustrated in FIG. 1 and a 5×3 channel array is illustrated in FIG. 2, the arrays may include more or less channels depending on the application. In other examples, a single scintillator may be present.

Scintillators may be sensitive to relatively high energy photons, electrons, or alpha particles, wherein high energy may be understood as being 1 KeV or greater including, but not limited to γ-rays or x-rays, as well as β-particles or α-particles. Upon absorbing such radiant energy, a scintillator may, in response, emit a light pulse. The light pulse may exhibit a maximum wavelength of emission in the range of 200 nm to 600 nm, including all values and increments therein. In addition, the light pulse may have a decay time in the range of 0.1 ns to 20000 ns, including all values and increments therein. The light pulse may then pass through the scintillator, which may be relatively transparent to one or more wavelengths of the light emitted by the scintillator. When provided in, for example, a detector, the light pulses may be converted into electrical signals via a photodetector.

Scintillators may be inorganic or organic. Examples of inorganic scintillators may include crystals such as thallium doped sodium iodide (NaI(Tl)) or thallium doped cesium iodide (CsI(Tl)). Additional examples of scintillation crystals may include barium fluoride, cerium-doped lanthanum chloride ($LaCl_3(Ce)$), bismuth germinate ($Bi_4Ge_3O_{12}$), cerium-doped yttrium aluminum garnet (Ce:YAG), cerium-doped lanthanum bromide ($LaBr_3(Ce)$), lutetium iodide ($LuI_3$), calcium tungstate ($CaWO_4$), cadmium tungstate ($CdWO_4$), lead tungstate ($PbWO_4$), zinc tungstate ($ZnWO_4$) or lutetium oxyorthosilicate ($Lu_2SiO_5$), as well as cerium doped-lutetium yttrium oxyorthosilicate ($Lu_{1.8}Y_{0.2}SiO_5(Ce)$). Scintillators may also include inorganic ceramics such as terbium-doped gadolinium oxysulfide (GOS(Tb)), or europium doped lutetium oxide ($Lu_2O_3(Eu)$). In addition, examples of organic scintillators may include polyvinyltoluene (PVT) with organic fluors present in the PVT as well as other polymer materials.

To prevent loss of light and/or cross talk between scintillators in an array a reflector may be provided surrounding at least a portion of the surface of each scintillator. In one example, the entire scintillator surface may be surrounded by reflector material except for a portion of which that may be in communication with a photodetector. As noted above, the reflectors may be composite reflectors including both diffuse and specular reflective components.

Figure 3A:
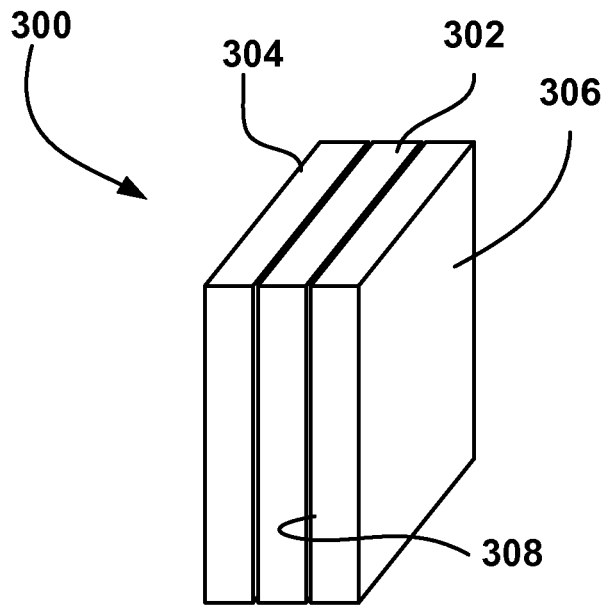
FIG. 3a illustrates an example of a composite reflector including both diffuse and specular reflective components.
Figure 3B:
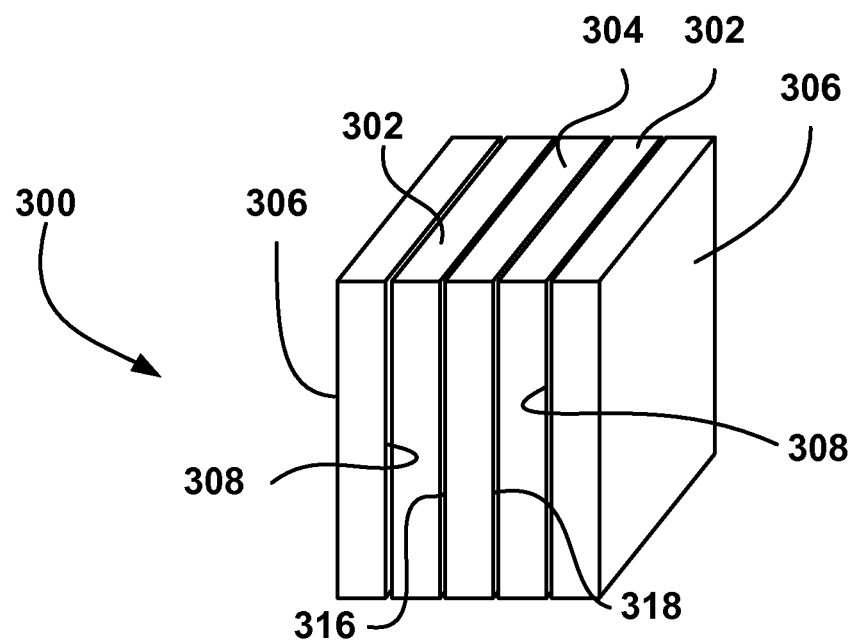
FIG. 3b illustrates another example of a composite reflector including both diffuse and specular reflective components.

FIG. 3a illustrates an example of a composite or scintillator reflector 300, in which the reflector 300 includes a diffuse material, which is illustrated in this example as a layer, 302 and a specular material, which is also illustrated in this example as a layer, 304. The diffuse material 302 may be positioned proximate to a portion of a surface 308 of the scintillator 306. FIG. 3b illustrates another example, in which the reflector 300 includes a specular layer 304 having a first and second surface 316, 318 and two diffuse layers 302, wherein each diffuse layer 302 may be arranged directly or indirectly adjacent to the first and second surface 316, 318 of the specular layer 304. Again, in this example, each diffuse layer 302 may be positioned proximally to a scintillator 306 surface 308, such as may be in the case of an array including at least two or more scintillators.

Figure 3C:
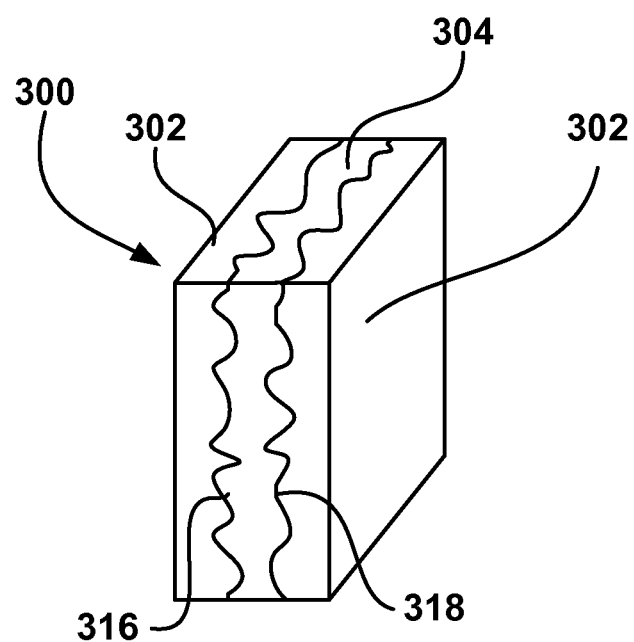
FIG. 3c illustrates a cross-sectional view of an example of a composite reflector.

It may be appreciated that additional material layers may be present in the reflector as well. In addition, the layers may not be definitive and contiguous layers as illustrated. Rather, in some examples, the reflector may include a gradient formed in a given material or materials including both relatively diffuse and relatively specular regions as well as layers that may intermingle or be interwoven including both relatively diffuse and relatively specular components, as illustrated in FIG. 3c, an example of a cross-sectional view of such a reflector.

Figure 4A:
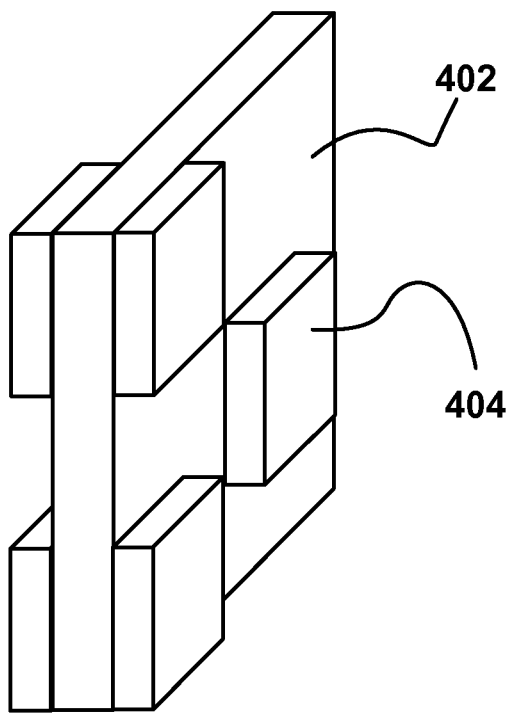
FIG. 4a illustrates another example of a composite reflector.
Figure 4B:
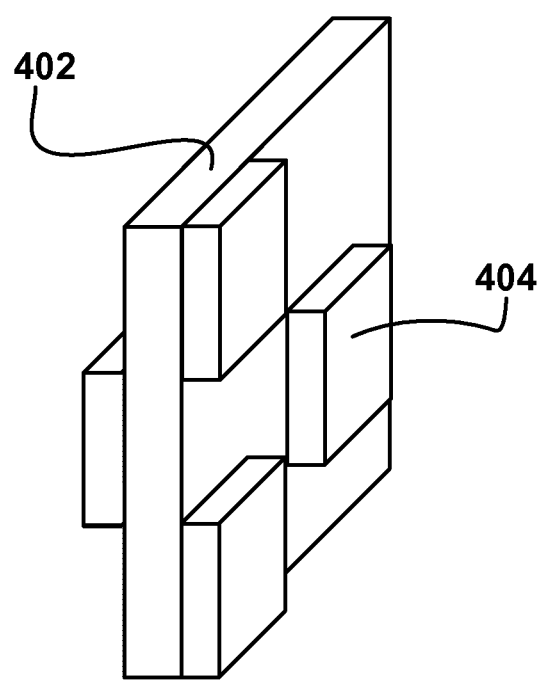
FIG. 4b illustrates yet another example of a composite reflector.
Figure 4C:
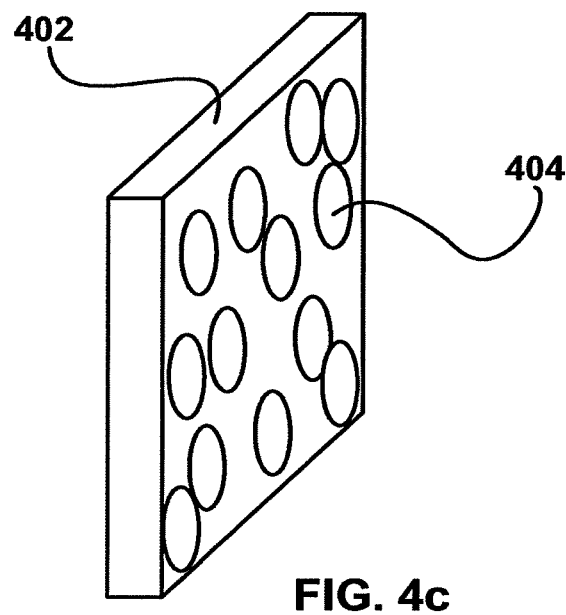
FIG. 4c illustrates yet still another example of a composite reflector.

In other examples, the diffuse reflector may only partially cover, i.e., cover at least a portion of, the specular layer in a patterned or random sense that increases the diffuse reflectivity of the otherwise specular surface. For example, as illustrated in FIG. 4a, portions of the specular reflector 402 may be exposed and portions of the specular reflector 402 may be covered by diffuse reflectors 404, which may be arranged in a pattern, as illustrated, or in a random array. In addition, while it is illustrated that the diffuse reflectors 404 may be provided on coincident portions on each side of the reflector (i.e., the first and second surfaces), it may be appreciated that the diffuse reflectors may be spaced on different portions on each side of the specular reflector surface, as illustrated in FIG. 4b. FIG. 4c illustrates a further example, where diffuse regions 404 may be provided over a specular reflector 402. The diffuse regions may be formed of a white paint, which may include for example titanium filled epoxy, or diffusely reflective material such as described herein. It may also be appreciated that one or more of the diffusive layers may be continuous and the specular layer may be interrupted or discontinuous.

In addition to the paint described above, the diffuse material may be formed of a polymeric material, such as polyester, polypropylene, polyolefin, nylons, fluorocarbons including TEFLON, etc. The material may, in some examples, be characterized as white in color. In addition, the diffuse material may be relatively translucent and allow in the range of 5% to 50% of incident light, including all values and increments therein, having a wavelength in the range of 200 nm to 800 nm, to pass through the diffuse layer, including all values and increments therein, when characterized at a thickness of 0.1 mm to 0.2 mm. Incident light may be understood as light that falls on or strikes a surface. In addition, at least a portion of the incident light may be reflected off of the diffuse material at one or more angles other than at the angle of incidence. It may be appreciated that in specular reflection, unlike diffuse reflection, the angle of incidence may be understood to be equal to the angle of reflection.

The diffuse material may also include a surface treatment improving adhesion. Such surface treatments may include, for example, irradiation or plasma treatment, exposure to electric discharge, oxidation, treatment with metal-ions such as sodium hydroxide, the application of coatings, etc. In addition, the thickness of the diffuse material may be in the range of 0.01 mm to 2 mm, including all values and increments therein. It may be appreciated that when two or more relatively diffuse material layers may be present in a reflector, the individual diffuse layers may be of the same thickness or of varying thicknesses. Furthermore, where two or more diffuse material layers may be present, the materials may be the same or may be different. An example of diffuse material that may be used in a diffuse layer may include DU PONT MELINEX PET film under the product number 339.

The specular layer material may be formed of a polymeric material, such as polyester including 2,6 polyethylene naphthalate, polybutylene naphthalate, terephthalate and/or copolymers thereof, acrylic, polyetherimide, polycarbonate, etc. In one example, the specular material may consist of one or more polymeric materials and/or may include one or more layers. In another example, the specular material may include a metal, such as aluminum, gold, copper, zinc, or alloys thereof, wherein the metal material may be formed into a film or otherwise deposited onto a polymeric layer. The material may exhibit a reflectance of 80% or more, including all values and increments in the range of 80% to 100%, of incident light, having a wavelength in the range of 200 nm to 800 nm, including all values and increments therein when characterized at a thickness of 0.065 mm. In addition, the specular material may have a thickness of 0.01 mm to 2 mm, including all values and increments therein. In one example, the specular material may include 3M VIKUITI ESR film.

Figure 5:
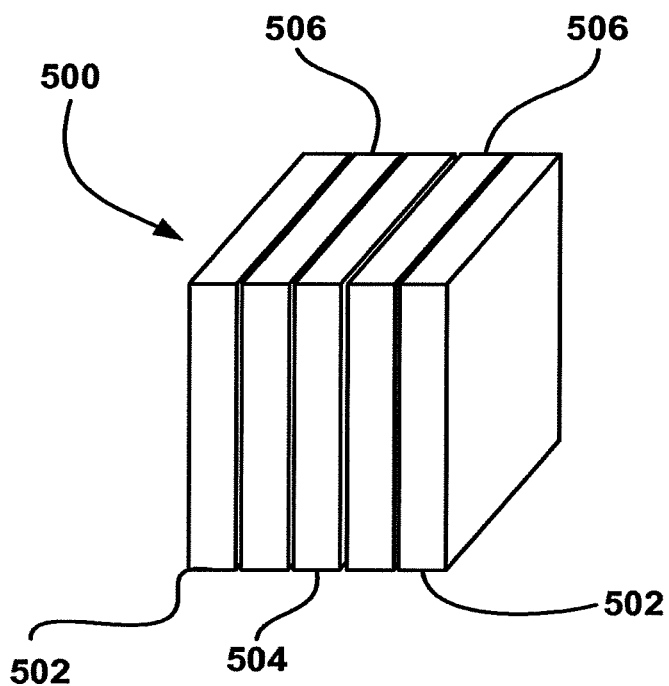
FIG. 5 illustrates yet another example of a composite reflector including both diffuse and specular reflective components.

In one example, illustrated in FIG. 5, the diffuse materials 502 and specular materials 504 in the composite reflector 500 may be joined together via an adhesive layer 506. In addition, the adhesive may be applied between the composite reflector and the scintillator. The adhesive may include, for example, an epoxy, acrylic, cyanoacrylate, etc. The adhesive may be relatively optically clear allowing 80% or more, including all values and increments in the range of 80% to 100%, of incident light having a wavelength in the range of 380 nm to 800 nm, including all values and increments therein, to pass through the adhesive when characterized at a thickness in the range of 0.050 mm to 0.254 mm. The adhesive may be applied at a thickness in the range of 0.001 to 0.100 millimeters, including all values and increments therein, such as 0.001 mm to 0.1 mm, etc. Furthermore, the adhesive may be disposed relatively continuously between or in a given pattern between or at select locations between the specular material and the diffusive material or the diffusive material and the scintillator.

The composite reflectors may exhibit an overall thickness of 0.01 mm to 0.5 mm, including all values and increments therein, such as in the range of 0.1 mm to 0.2 mm, 0.05 mm to 1 mm, 0.13 mm or less, etc. The reflector may exhibit a total reflectance of greater than 70%, including all values and increments in the range of 70% to 100%, of incident light having a wavelength in the range of 350 nm to 750 nm, including all values and increments therein, when characterized at a thickness of 0.11 mm. Total reflectance may be understood as the reflectance, both diffuse and specular, exhibited by the composite reflector.

In addition, the reflector may exhibit a specular reflectance of less than 10%, including all values and increments in the range of 1% to 10%, of incident light having a wavelength in the range of 350 nm to 750 nm, including all values and increments therein, when characterized at a thickness of 0.11 mm. Specular reflectance may be understood as the reflectance of light wherein the reflected angle is the same as the incident angle with respect to a normal plane of the sample surface.

Furthermore, the reflector may exhibit a diffuse transmission through the reflector of less than 15%, including all values and increments in the range of 0.1% to 15%, of incident light having a wavelength in the range of 350 nm to 750 nm, including all values and increments therein, when characterized at a thickness of 0.11 mm. Diffuse transmission may be understood as the amount of light that is transmitted through the composite reflector, that is, light not otherwise reflected or otherwise absorbed by the reflector. It may be appreciated that the characterizations herein may differ depending on the thickness of the samples characterized.

In examples of various applications, the composite reflectors may exhibit a 90% or greater reflectivity of light at a wavelength of 415 nm, such as that produced by a NaI(Tl) scintillator, including all values and increments therein, including reflectivity of greater than 98.5%. In addition, the reflector may exhibit a 94% or greater reflectivity of light at a wavelength of 480 nm, such as that produced by a BGO scintillator, including all values and increments therein, including reflectivity of greater than 97.0%. Furthermore, the reflector may exhibit a 91% or greater reflectivity of light at a wavelength of 550 nm, such as that produced by a CsI(Tl) scintillator, including all values and increments therein, including reflectivity of greater than 94.4%.

In assembling a scintillator array, the reflectors may be positioned between the individual scintillation channels or scintillators. In one example, referring again to FIG. 2, a reflector 204a may be provided between the rows 208 or the columns 206 of the scintillator array and additional reflectors 204b may be provided to fill in the spaces in another direction. In another example, a reflector may be wrapped around each scintillator and the reflector may be scored or grooved to facilitate bending of the reflector around any corners or edges. An adhesive may be applied to the reflector or scintillator prior to the application of the reflector to the scintillator, such that the adhesive is disposed between the reflector and the scintillator.

Figure 6:
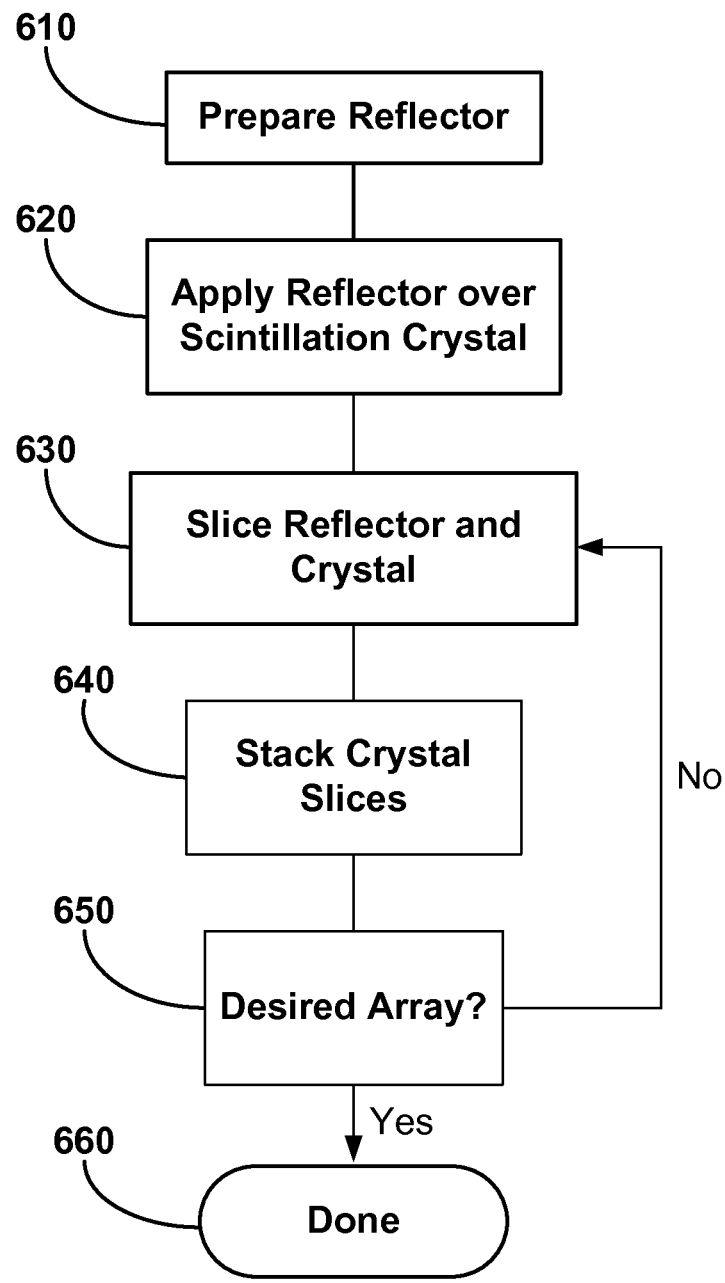
FIG. 6 illustrates a flow diagram of an example of a method of forming a scintillator array.

In one example, illustrated in FIG. 6, a reflector may be prepared in a sheet having a given length and width 610. Each sheet may then be applied over a scintillator of given dimensions 620. Optionally, an adhesive may be applied between the sheet and the reflector. The sheet and scintillator combination may then be sliced into pieces of a given dimension that may be relatively smaller than that of the entire sheet 630. The pieces may be stacked 640 and cut again 650 until an array of a desired dimension is formed 660. In another example, an adhesive may be disposed between the sheet and scintillator and, additionally, between the various stacked layers. The array may then be positioned within a detector.

Figure 7:
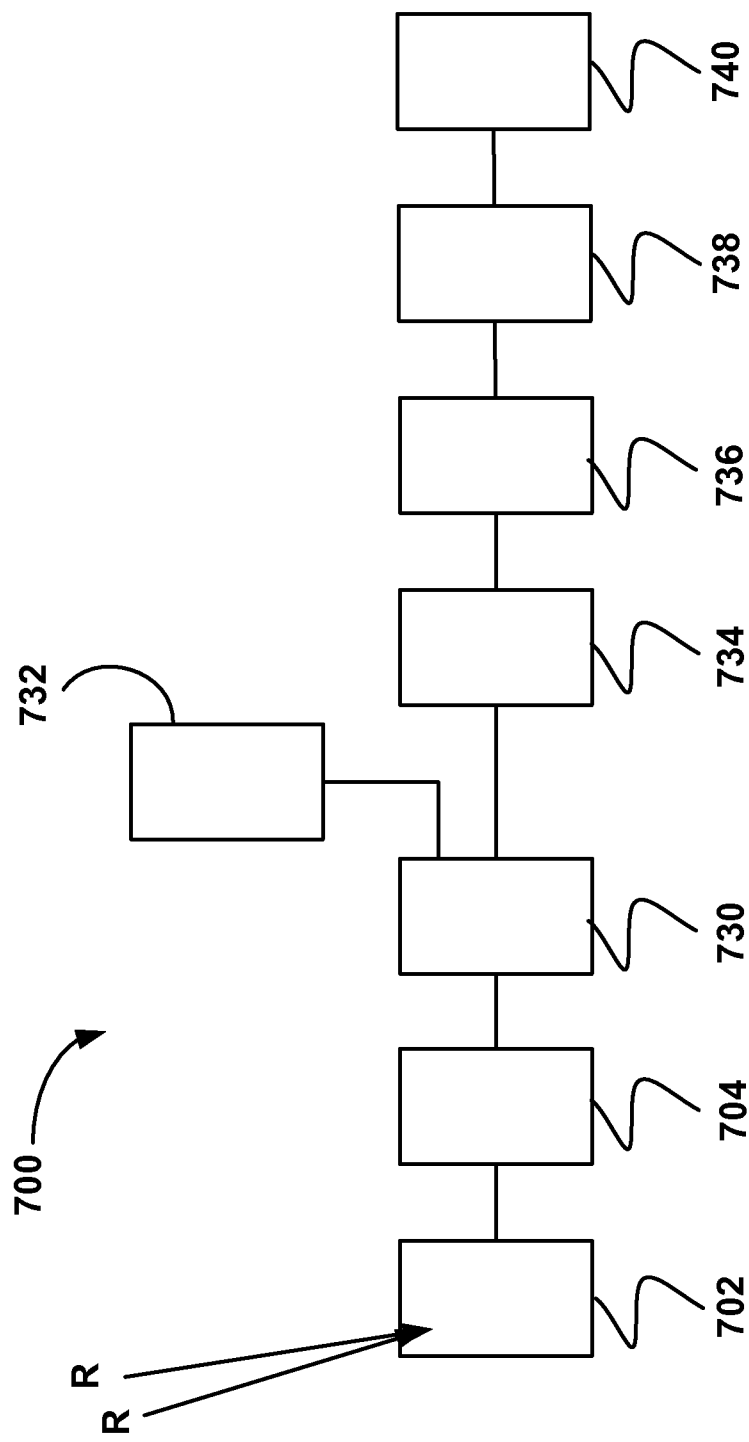
FIG. 7 illustrates a representation of an example of a scintillation detector.

As alluded to above and illustrated in FIG. 7, scintillation detectors 700 may include one or more scintillation arrays 702 as described herein and may generally be used to detect various waves or particles R that may not be easily detected by conventional photodetectors. The scintillator, or scintillation crystal, ceramic or polymer, may absorb ionizing waves or particles and converts the energy of the waves or particles to a light pulse. The light may be converted to electrons (i.e., an electron current) with a photodetector 704 such as a photodiode, charge coupled detector (CCD) or photomultiplier tube.

In one example, the photodetector 704 may be a photomultiplier tube (PMT). As photons emitted from the scintillator strike a photocathode within the photomultiplier tube, electrons may be generated producing a signal representative of the incident waves or particles absorbed by the scintillator. The photomultiplier 704 may be biased by a high voltage power supply 730, which connects to a voltage divider 732. The voltage divider 732 may divide the high voltage into a series of steps to accelerate the electrons from one photomultiplier stage to the next. The photomultiplier may multiply or amplify the signal produced by at least a few orders of magnitude, such as in the range of $10^2$ to $10^8$.

The signal provided by the photodetector 704 may then be processed by a pre-amplifier 734 and an amplifier 736, an analog to digital converter 738 and then by a multi-channel analyzer 740 to which the photodetector 704 may be in electrical communication. In one example, the pre-amplifier may amplify or increase the signal received from the photodetector and the amplifier may shape or filter the signal received from the pre-amplifier. However, it may be appreciated that other arrangements may be utilized herein as well.

Scintillation detectors may be used in various industries and applications including medical (e.g., to produce images of internal organs), geophysical (e.g., to measure radioactivity of the earth), inspection (e.g., non-destructive, non-invasive testing), research (e.g., to measure the energy of photons and particles), and health physics (e.g., to monitor waves or particles in the environment as it affects humans). Medical devices may include positron emission tomography scanners, gamma cameras, computed tomography scanners and radioimmunoas say applications. Geophysical devices may include well logging detectors. Inspection devices may include radiance detectors, such as thermal neutron activation analysis detectors, luggage scanners, thickness gauges, liquid level gauges, security and manifest verification devices both active and passive devices, spectroscopy devices (radioisotope identification devices) both active and passive devices, and gross counters both active and passive. Research devices may include spectrometers and calorimeters. Health physics applications may include laundry monitoring and area monitoring.

EXAMPLE

A 0.11 mm reflector including both diffuse and specular reflective components (the composite reflector) was formed including a layer of a specular reflector (0.065 mm 3M VIKUITI ESR) sandwiched between a first and second layer of 92 gauge DUPONT 339 polyester film epoxied together. The reflectivity characteristics, including total reflectivity, spectral reflectivity and diffuse reflectivity, were then measured in comparison with a 0.1 mm thick DUPONT 339 polyester film reflector using a PERKIN ELMER SPECTROPHOTOMETER (model Lambda 950 UV-Vis/NIR with Labsphere Integrating Reflectance Accessory).

Figure 8:
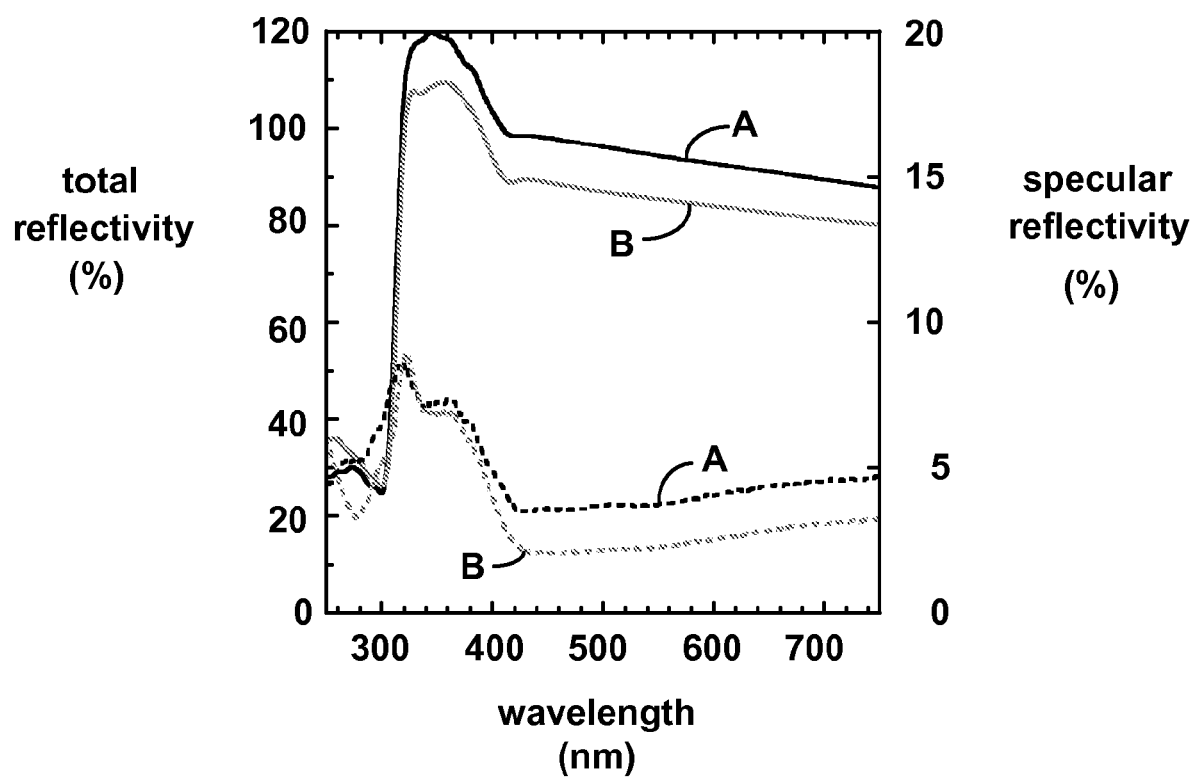
FIG. 8 illustrates a characterization of total reflectivity and specular reflectivity for an example of a composite reflector versus a diffuse reflector over a wavelength range of 250 nm to 750 nm.

FIG. 8 illustrates the difference in total reflectivity (%) and specular reflectivity (%) measured in the two samples over a wavelength range of 250 nm to 750 nm. The composite reflector is labeled "A" and the reflector including a diffuse film is labeled "B". As can be seen in FIG. 8, the total reflectivity measured for the composite reflector is relatively higher over a wavelength range of 350 nm to 750 nm than the total reflectivity measured for the reflector including only the diffuse film (illustrated by the solid lines). In addition, the specular reflectivity of the composite reflector is relatively higher than that of the diffuse reflector (illustrated by the broken lines).

Figure 9:
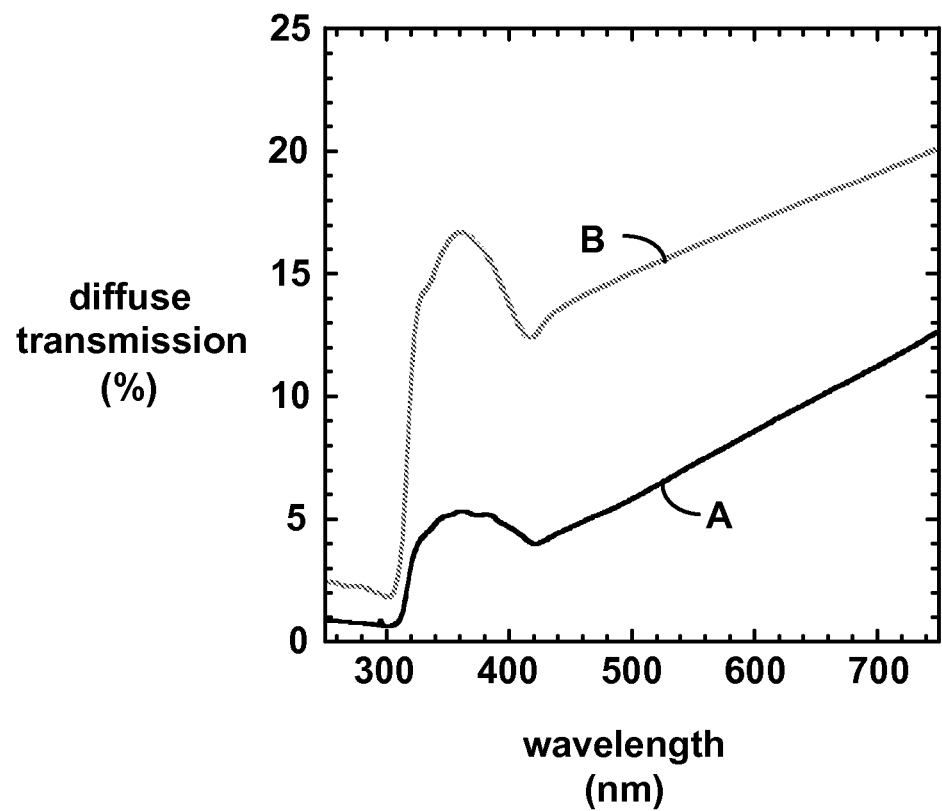
FIG. 9 illustrates a characterization of diffuse transmission for an example of a composite reflector versus a diffuse reflector over a wavelength range of 250 nm to 750 nm.

FIG. 9 illustrates a comparison of the diffuse transmission of the composite reflector and the diffuse reflector over a wavelength range of 250 nm to 750 nm. Once again, the composite reflector is labeled "A" and the reflector including a diffuse film is labeled "B". The composite reflector exhibits a relatively lower diffuse transmission than the diffuse reflector over a wavelength range of 350 nm to 750 nm.

It may be appreciated that the "bumps" exhibited in measurements in the wavelength range of about 300 nm to about 425 nm may be due to fluorescence of the material at such wavelength range.

Accordingly, it may be appreciated that contemplated herein is a scintillator reflector, wherein the scintillator reflector may include a composite reflector including a specular material having a first and second surface, a first diffuse material arranged adjacent to the first surface of the specular material and an adhesive joining the diffuse material and the specular material, wherein the reflector exhibits a total reflectance of greater than 70% of incident light having a wavelength in the range of 350 nm to 750 nm when characterized at a thickness of 0.11 mm. In addition, the specular material of the scintillator reflector may consist of one or more layers of a polyester material exhibiting a reflectance of 80% or more of incident light having a wavelength in the range of 200 nm to 800 nm when characterized at a thickness of 0.065 mm. The scintillator reflector may also exhibit a diffuse transmission of less than 15% of incident light having a wavelength in the range of 350 nm to 750 nm when characterized at a thickness of 0.11 mm. The scintillator reflector may exhibit an overall thickness in the range of 0.01 mm to 0.5 mm. Furthermore, the adhesive may transmit 80% or more of incident light having a wavelength in the range of 380 nm to 800 nm when characterized at a thickness of 0.050 mm to 0.254 mm.

Also contemplated herein, is a scintillation detector. The scintiallator detector may include a scintillator including a surface and may include a scintillation reflector described above, including one or more of the above recited features, surrounding at least a portion of the scintillator surface, wherein the first diffuse material is arranged proximal to the scintillator surface. The scintillator reflector may further include a second diffuse material arranged adjacent to the second surface of the specular material. In addition, the scintillation detector may include at least two scintillators wherein the scintillator reflector, which may include a second diffuse material, is disposed between the scintillators. Again, the scintillator reflector used in the detector may have a total thickness of less than 0.13 mm. The diffuse material may have a thickness in the range of 0.01 mm to 2 mm. In addition, the specular material may have a thickness in the range of 0.01 mm to 2 mm. The specular material may consist of a polymer material and the diffuse material may also include a polymeric material.

It may be appreciated that the scintillation detector described above may be provided in optical communication with a photodetector, wherein the photodector may, in some examples, include a photomultiplier tube. It may also be appreciated that a scintillation detection system may be provided. The scintillation detection system may include a scintillation detector, as described above, including a scintillator having a surface, a scintillator reflector as described above surrounding at least a portion of the scintillator surface, wherein the first diffuse material is arranged proximate to the scintillator surface. The system may also include a photodetector in optical communication with the scintillator and an analyzer in electrical communication with the photodetector.

It may be appreciated that the scintillator detector described above incorporating the scintillator reflector described above may be present in a number of devices. For example, scintillator and the scintillator reflector may be present in a medical device, such as, but not limited to those devices selected from the group consisting of a positron emission tomography scanner, a gamma camera, and a computed tomography scanner. In another example, the scintillator and the scintillator reflector may be present in a well logging detector. In a further example, the scintillator and the scintillation detector may be present in an inspection apparatus, such as, but not limited to those devices selected from the group consisting of a thermal neutron activation analysis detector, luggage scanner, thickness gauge, liquid level gauge, active security and manifest verification device, passive security and manifest verification device, active spectroscopy device, passive spectroscopy device, active gross counters and passive gross counters. In another example, the scintillator detector and scintillator reflector may be present in a research device, wherein the research device may include, for example, a spectrometer and/or a calorimeter.

A method of forming the scintillation reflector described above is also contemplated herein. The method may include arranging a first surface of the first diffuse material proximal to at least a portion of a scintillator surface, wherein the first diffuse material further includes a second diffuse material surface and the specular material is arranged adjacent to the second diffuse material surface of the first diffuse material. The method may also include applying the adhesive to one of the second surface of the first diffuse material and the specular material. The method may further include applying the adhesive to one of the first surface of the first diffuse material and the scintillator. It may be appreciated that the first diffuse material and the specular material comprises a first sheet and the scintillator comprises a second sheet and that the method may further include cutting the sheets into slices and stacking the slices. In addition, the method may include arranging a second diffuse material adjacent to the specular material opposite the first diffuse material.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A scintillation detector, comprising:
   a first scintillator having a first surface; and
   a composite reflector adjacent to at least a portion of the first surface, wherein:
      the composite reflector includes a specular material layer having a first and second surface, an adhesive layer disposed on the first surface of the specular material layer, and a diffuse material layer disposed on the adhesive layer, wherein the diffuse material layer is adjacent to the first scintillator and is capable of transmitting 5% to 50% of incident light in a wavelength range of 200 nm to 800 nm.

2. The scintillation detector of claim 1, wherein the composite reflector further includes a second adhesive layer disposed on the second surface of the specular material layer and a second diffuse material layer disposed on the second adhesive layer.

3. The scintillation detector of claim 1, further comprising a second scintillator, wherein the first and second scintillators are disposed along a same side of the composite reflector.

4. The scintillator detector of claim 3, wherein further comprising an adhesive layer capable of transmitting 80% or more of incident light having a wavelength in the range of 380 nm to 800 nm.

5. The scintillation detector of claim 1, wherein the scintillator is in optical communication with a photodetector.

6. The scintillator detector of claim 1, wherein the diffuse material layer includes a polyolefin or a fluorocarbon.

7. The scintillation detector of claim 1, wherein the composite reflector exhibits a diffuse transmission of less than 15% of incident light having a wavelength in the range of 350 nm to 750 nm.

8. The scintillation detector of claim 1, wherein the diffuse material layer directly contacts the scintillator.

9. A method of forming a scintillation detector, comprising:
   arranging a first surface of a diffuse material layer proximal to at least a portion of a scintillator surface such that the first surface of the diffuse material layer is adjacent to the scintillator, wherein the diffuse material layer is capable of transmitting 5% to 50% of incident light in a wavelength range of 200 nm to 800 nm, and wherein the diffuse material layer further includes a second surface; and
   arranging a specular material layer adjacent to the second surface of the diffuse material layer.

10. The method of claim 9, further comprising applying adhesive to one of the second surface of the first diffuse material layer and the specular material layer.

11. The method of claim 9, wherein the first diffuse material layer and specular material layer comprises a first sheet and the scintillator comprises a second sheet.

12. The method of claim 11, further comprising cutting the sheets into slices and stacking the slices.

13. The method of claim 9, further comprising arranging a second diffuse material layer adjacent to the specular material layer opposite the first diffuse material layer.

14. A scintillation detection system, comprising:
   a scintillator having a surface;
   a composite reflector surrounding at least a portion of the scintillator surface, wherein the composite reflector includes a specular material layer having a first and second surface, an adhesive layer disposed on the first surface of the specular material layer, and a diffuse material layer disposed on the adhesive layer, wherein the diffuse material is adjacent to the surface of the scintillator, and wherein the composite reflector exhibits a diffuse transmission of less than 15% of incident light having a wavelength in the range of 350 nm to 750 nm;
   a photodetector in optical communication with the scintillator; and
   an analyzer in electrical communication with the photodetector.

15. The scintillation detection system of claim 14, wherein the diffuse material layer directly contacts the scintillator.

16. The scintillation detection system of claim 14, wherein the diffuse material layer is capable of transmitting 5% to 50% of incident light in a wavelength range of 200 nm to 800 nm.

17. A medical device comprising:
a first scintillator having a first surface;
a second scintillator having a second surface;
a composite reflector adjacent to the first surface of the first scintillator and the second surface of the second scintillator, wherein:
the first and second scintillators are disposed along a same side of the composite reflector; and
the composite reflector includes a specular material layer and a diffuse material layer disposed between the specular material layer and first and second scintillators; and
the first diffuse material is adjacent to the surface of the scintillator; and
an adhesive layer disposed between the first diffuse material layer and each of the first and second scintillators, wherein the adhesive layer is capable of transmitting 80% or more of incident light having a wavelength in the range of 380 nm to 800 nm.

18. The medical device of claim 17, wherein the medical device is selected from the group consisting of a positron emission tomography scanner, a gamma camera, and a computed tomography scanner.

19. The medical device of claim 17, wherein the diffuse material layer is capable of transmitting 5% to 50% of incident light in a wavelength range of 200 nm to 800 nm.

* * * * *